UNITED STATES PATENT OFFICE.

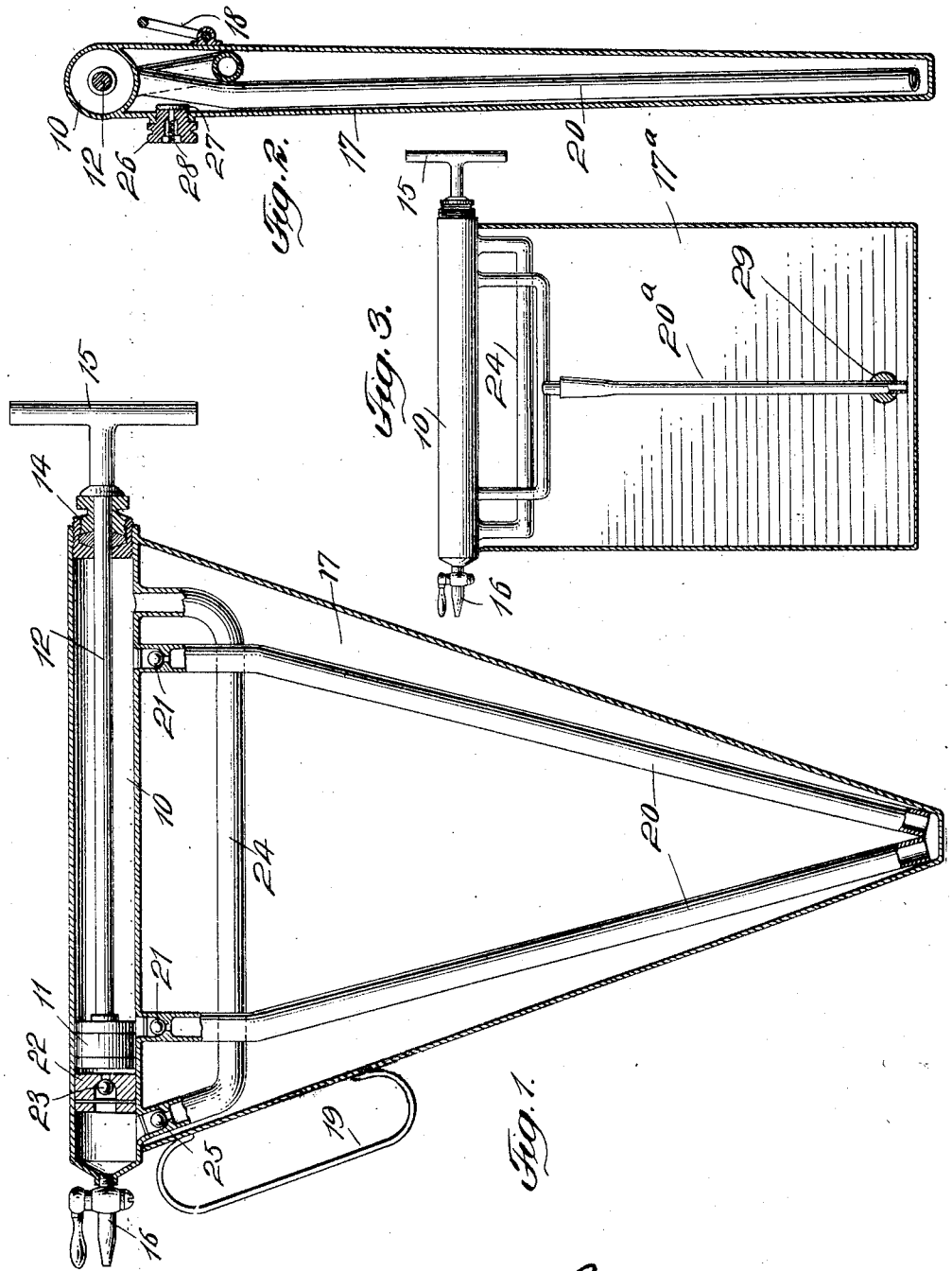

ROBERT S. HICKISH, OF TUCKAHOE, NEW YORK, ASSIGNOR, BY MESNE ASSIGNMENTS, TO EDWARD T. POWELL, OF COLUMBUS, OHIO.

FIRE-EXTINGUISHER.

1,203,334.     Specification of Letters Patent.     Patented Oct. 31, 1916.

Application filed October 7, 1912. Serial No. 724,489.

*To all whom it may concern:*

Be it known that I, ROBERT S. HICKISH, a citizen of the United States, and a resident of Tuckahoe, county of Westchester, and State of New York, have invented certain new and useful Improvements in Fire-Extinguishers, of which the following is a full, clear, and exact description.

My invention relates to an improvement in fire extinguishers of the class wherein a liquid extinguishing fluid is employed and carried therein, a tank, the same embodying a form of hand-operated pump by which the contents of the tank may be thrown upon the fire.

The object of my invention is primarily to insure a steady supply of this liquid to the pump, irrespective of the position in which the device is placed, as the same is thrown about to direct the spray of liquid at different elevations or to different points.

With this end in view my invention resides in a certain special device of a construction and combinations of parts which will be fully set out hereinafter, and particularly pointed out in the claims.

Reference is now had to the accompanying drawings, which illustrate as an example the preferred embodiment of my invention.

In said drawings Figure 1 is a longitudinal section; Fig. 2 is a cross section; Fig. 3 is a longitudinal section of a modification.

Referring first to Figs. 1 and 2, 10 indicates the barrel or cylinder of the pump, the same being fitted with a piston 11, the rod, 12, whereof passes through a stuffing-box, 14, at one end of the cylinder, and fitted outside of said stuffing-box with a handle, 15. At the end of the cylinder 10, opposite the stuffing-box 15, a pet cock 16 is located, through which the flood is ejected. Said cylinder or barrel 10 is seated or otherwise firmly secured within the upper end of the tank 17. The preferred form of this tank is triangular, as shown in Fig. 1, and flattened in cross section, as shown in Fig. 2. This is the most favored form for the tank, and by being flattened as shown, it will hang snugly against a wall or like support, for which purpose the tank is furnished with a bail 18 (see Fig. 2). For convenience in handling, the tank is also provided with a handle 19 by which the whole apparatus may be carried, and also by which the hand of the operator may be steadied in gripping the tank while operating the pump. The connection between the pump, cylinder and tank at the rear end of the latter is, of course, hermetic. The pump is double-acting, and is furnished, according to this, with two inlet or intake pipes 20, which extend from the pointed lower extremity of the tank 17 upward through the tank to the respective end portions of the cylinder 10. At the said upper ends of the intake tubes 20 check valves 21 are provided, the same seated outward from the cylinder to prevent back flow through the intake pipes. Near the discharge end of the cylinder is located a plug or partition 22 fitted with a check valve 23, the same opening toward the pet cock 16.

24 is a by-pass pipe extending from the end of the cylinder 12 adjacent the stuffing-box 14 to the opposite end of the cylinder, but at a point between the plug 22 and the pet cock 16. This by-pass pipe 24 is intended to carry the liquid from the right hand or rear end of the cylinder around to the front end and its discharge end, said by-pass 24 being furnished with a check valve 25 opening into the discharge end of the cylinder 10.

The tank 17 is furnished with a plug 26 which is preferably screwed into place, and therefore being easily removable, and this plug carries a vent valve 27 yieldingly seated by a spring 28. Said valve is designed to open inward under the influence of the atmospheric pressure to allow the easy discharge of the contents of the tank.

In the operation of the device the tank 17 is filled with the fluid fire extinguishing substance, and normally the pet cock 16 is closed. The tank is filled through the opening and is normally closed by the plug 26. When it is desired to discharge the whole or a part of the contents of the device upon a fire, the pet cock 16 is opened and the pump piston is reciprocated in the cylinder. Referring to Fig. 1, and assuming that the piston is moving rightwardly, the valve 21 of the right-hand intake pipe 20 will be seated and the valve 21 of the left-hand intake pipe will be lifted from its seat, so that the liquid is drawn from the tank 17 into the pump cylinder. Then, upon reversing the movement of the piston, the contents of the cylinder thus introduced are ejected, the said left-hand valve 21 seating and the valve 23 unseating to allow the free passage of the liquid. The leftward movement of the piston just described will fill the right-hand end of the cylinder 10, and upon a second rightward movement of the piston, the valve 25 will unseat, and the liquid in the right-hand end of the piston will be ejected from the by-pass pipe 24 and out into the atmosphere through the cock 16.

The form of the tank, as I have before stated, is not essential, though I prefer the triangular form illustrated.

Fig. 3 illustrates the tank 17ª of rectangular form. Various other shapes may be given to the tank without departing from the spirit of my invention.

Fig. 3 illustrates a further modification of my invention wherein one intake tube 20ª is provided. This tube is flexible and furnished with a weight 29. This weight will cause the intake tube to swing from side to side as the device is tilted, and will always hold the receiving end of the intake tube in the lowest part of the tank, insuring that all of the contents of the tank are subject to the sucking action of the pump. Otherwise the form of the invention shown in Fig. 3 is the same as that previously described.

Having thus described my invention, what I claim is:

1. A fire extinguisher comprising a triangular tank in combination with a liquid pump extending across one of the sides of said triangular tank and rigidly secured thereto, said pump provided with an intake tube permanently extending to the angle of the triangular tank which is removed from the pump.

2. A fire extinguisher comprising a triangular tank in combination with a double acting liquid pump extending across and constituting one of the sides of the said tank, said pump being rigidly secured to said side and provided with two intake tubes extending from the respective ends of said pump to the angle of the triangular tank remote from the pump.

3. A fire extinguisher comprising, in combination, a substantially triangular shaped tank flattened in cross section, a manually operable pump the casing of which closes one of the sides of said tank, and an intake connected to said pump the free end of which is adapted to extend into the angle of the triangular tank opposite the pump.

4. A fire extinguisher comprising, in combination, a substantially flat triangular tank and a double acting liquid pump the casing of which closes one of the sides of said tank, and intakes secured to said pump and the free ends of which are adapted to extend into the angle at the lower portion of the tank.

5. In a fire extinguisher, a substantially triangular shaped tank flattened in cross section, in combination with a manually operable pump the casing of which closes one of the sides of the said tank, said pump comprising a reciprocating piston, fluid intakes connected to the pump chambers on either side of said piston and extending into the angle of the triangular tank opposite the pump, and discharge ports for each of said chambers.

6. In a fire extinguisher, a substantially triangular shaped tank flattened in cross section, in combination with a manually operable pump, the casing of which closes one of the sides of said tank, said pump comprising a reciprocating piston, fluid intakes connected to the chambers on each side of said piston and extending into the angle of the triangular tank opposite the pump, discharge ports for said pump, and check valves in said intakes and discharge ports.

7. A fire extinguisher comprising a triangular tank in combination with a pump extending across and constituting one of the sides of the said tank, said pump being rigidly secured to said side and provided with inlet and discharge tubes one of which extends into the angle of the triangular tank opposite said pump.

8. In a fire extinguisher, a substantially triangular shaped tank flattened in cross-section, in combination with a manually operable pump the casing of which closes one of the sides of the tank, said pump comprising a reciprocating piston, a fluid intake for the pump extending into the angle of the triangular tank opposite said pump, and a plug located in the forward end of the pump barrel and provided with a discharge port therein.

9. In a fire extinguisher, a substantially triangular shaped tank flattened in cross-section, in combination with a manually operable pump the casing of which closes one of the sides of the tank, said pump comprising a reciprocating piston, fluid intakes connected to the chambers in the front and in the rear of said piston and extending into the angle of the tank opposite to the pump, discharge means provided with ducts which discharge into a common chamber at the forward end of said pump, and a discharge nozzle connected to the last mentioned chamber.

In testimony whereof I have signed my name to this specification in the presence of two subscribing witnesses.

ROBERT S. HICKISH.

Witnesses:
KATE ROSENBERG,
ISAAC B. OWENS.